A. S. GODDARD.
CANOPY RING FOR LIGHTING FIXTURES.
APPLICATION FILED JUNE 5, 1911.
1,010,893.
Patented Dec. 5, 1911.
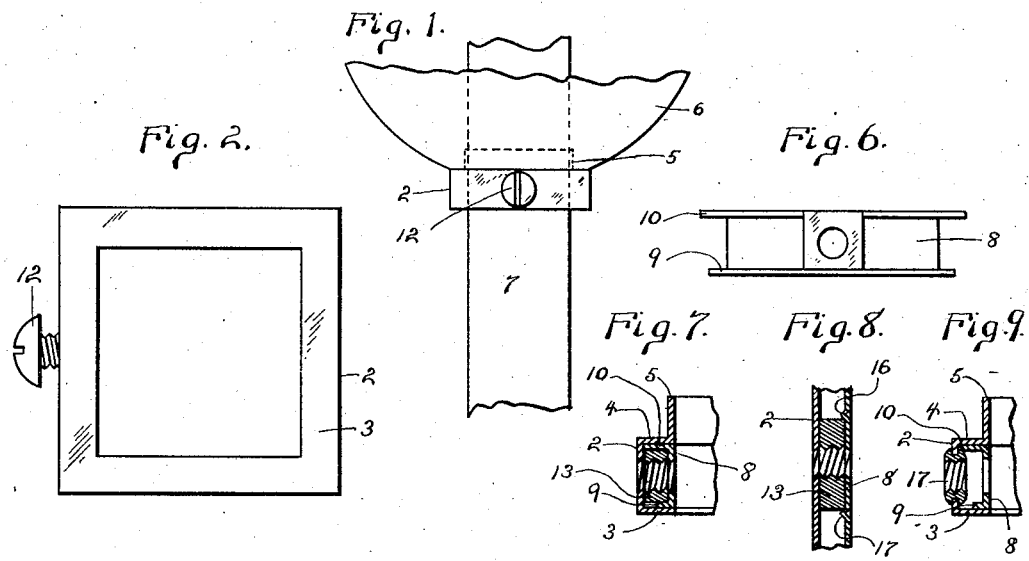
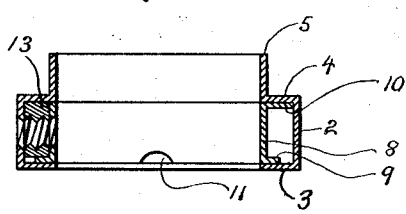
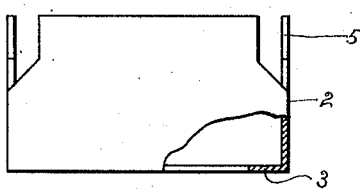
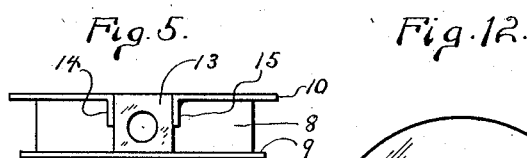
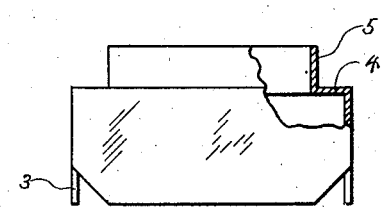
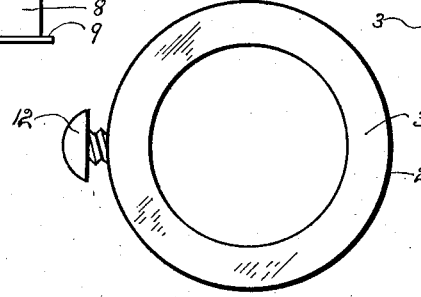

UNITED STATES PATENT OFFICE.

ARTHUR S. GODDARD, OF WATERBURY, CONNECTICUT, ASSIGNOR TO WATERBURY MFG. CO., OF WATERBURY, CONNECTICUT, A CORPORATION.

CANOPY-RING FOR LIGHTING-FIXTURES.

1,010,893.      Specification of Letters Patent.      Patented Dec. 5, 1911.

Application filed June 5, 1911. Serial No. 631,476.

*To all whom it may concern:*

Be it known that I, ARTHUR S. GODDARD, a citizen of the United States, residing at Waterbury, in the county of New Haven and State of Connecticut, have invented a new and useful Improvement in Canopy-Rings for Lighting-Fixtures; and I do hereby declare the following, when taken in connection with the accompanying drawings and the letters of reference marked thereon, to be a full, clear, and exact description of the same, and which said drawings constitute part of this specification, and represent, in—

Figure 1 a side view of a portion of a lighting fixture showing a canopy supported by my improved ring. Fig. 2 a plan or underside view of one form of ring. Fig. 3 a transverse sectional view of the same. Fig. 4 a side view partially in section, of the blank from which the ring is formed. Fig. 5 a side view of the collar detached, showing the screw supporting nut held by fingers turned inward from the upper flange. Fig. 6 a similar view showing the nut held in place by the edges of the flange which are cut away to clear the nut. Fig. 7 a broken sectional view showing the nut located between the two flanges. Fig. 8 a transverse sectional view of the same showing the sides of the nut held in place by inwardly projecting ribs. Fig 9 a sectional view of the ring showing another form of reinforced support for the screw. Fig. 10 a plan or underside view of a ring with the bottom flange formed by turning the edge of the metal inward. Fig. 11 a side view partially in section of the blank from which the ring shown in Fig. 7 is formed. Fig. 12 an elevation view of a round ring.

This invention relates to an improvement in canopy rings for lighting fixtures, and particularly to the ring or clamping devices employed for holding canopies or shells of lighting fixtures in position. These canopies or shells are set over the tubes of lighting fixtures and are held against the wall by the ring which is clamped to the fixture. These rings are frequently made from solid stock and comprise a ring and a screw by which the ring is clamped to the fixture.

The object of this invention is to form the ring from two pieces of sheet metal so connected as to give the required strength and provide suitable bearing for the screw and the invention consists in the construction hereinafter described and particularly recited in the claims.

In carrying out my invention I employ an outer ring 2 struck up from sheet metal forming a bottom flange 3 and upper flange 4 and skirt 5 which sets into the canopy or shell 6 which it is desired to attach to a pipe 7 of a lighting fixture. Within the ring 2 is a sheet metal collar 8 formed with outwardly turned flanges 9 and 10 which closely fit between the flanges 3 and 4. At one or more points the edge of the collar 8 is formed with notches 11 which provide means for the escape of material into which the devices are dipped when being finished. To secure the ring in position on a fixture a screw 12 is inserted through alined perforations in the ring and collar; and to form a bearing for this ring a nut 13 may be inserted between the ring and collar, and this nut may be held in place by turning the fingers 14 and 15 in from the edge of the flange 10 as shown in Fig. 5, or the flange 10 may be cut away corresponding in length to the size of the nut which will be held from moving by the edges of the flange as shown in Fig. 6; or the nut may be located between the two flanges as shown in Fig. 7 of the drawings, and in this case ribs 16 and 17 will be struck inward from the face of the collar on opposite sides of the nut as shown in Fig. 8 of the drawings. Or, instead of employing a nut, the wall of the collar through which the screw passes may be reinforced by an eyelet 17 as shown in Fig. 9 of the drawings. In striking up the ring instead of punching out the bottom to form the opening through the ring and folding the edge of the metal inward to form the upper flange and skirt, as shown in Figs. 2, 3 and 4, the metal may be struck the other way and the edge of the metal folded inward to form the lower flange 3, as shown in Figs. 10 and 11 of the drawings. The shape of the ring will correspond to the tube to which it may be applied, and may be rectangular as shown in Figs. 2 and 10, or may be round as shown in Fig. 9. This construction permits the ring to be struck up from sheet metal and is as rigid as though formed from solid stock.

I claim:—

1. A canopy supporting ring for lighting fixtures consisting of a ring struck up from sheet metal and comprising upper and lower flanges, a collar formed from sheet metal and having outwardly turned flanges adapted to fit between the flanges of the ring, and a screw passing through the ring and collar.

2. A canopy supporting ring for lighting fixtures comprising a ring having lower and upper flanges and an upwardly projecting skirt, a collar having outwardly turned flanges located within the flanges of the ring, and a screw extending through said ring and collar.

3. A canopy supporting ring comprising a ring including inwardly extending lower and upper flanges, a collar having outwardly extending flanges adapted to fit between the flanges of the ring, the ring and collar formed with alined openings, reinforcement for said openings, and a screw having a bearing in said reinforcement adapted to extend through the said ring and collar.

In testimony whereof, I have signed this specification in the presence of two subscribing witnesses.

ARTHUR S. GODDARD.

Witnesses:
 FREDERIC C. EARLE,
 CLARA L. WEED.

Copies of this patent may be obtained for five cents each, by addressing the "Commissioner of Patents, Washington, D. C."